United States Patent
Henn et al.

(10) Patent No.: US 7,802,481 B2
(45) Date of Patent: Sep. 28, 2010

(54) HIGH-PRESSURE SENSOR DEVICE AND METHOD FOR MANUFACTURING SAME

(75) Inventors: Ralf Henn, Gomaringen (DE); Axel Jasenek, Stuttgart (DE); Arno Stoetzler, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/453,716

(22) Filed: Jun. 14, 2006

(65) Prior Publication Data

US 2006/0278002 A1 Dec. 14, 2006

(30) Foreign Application Priority Data

Jun. 14, 2005 (DE) .................. 10 2005 027 365

(51) Int. Cl.
*G01L 7/08* (2006.01)
*G01J 5/46* (2006.01)

(52) U.S. Cl. ................... 73/715; 250/231.19

(58) Field of Classification Search ............. 73/7, 73/717, 721, 727, 754, 706, 715, 756, 753, 73/777, 862, 632, 720, 725, 398, 862.62, 73/862.65, 862.042; 250/214 R, 214.1, 239, 250/208.4, 208.5, 227.18, 231.19, 238; 338/36, 338/42, 47; 257/417, 419, 254
See application file for complete search history.

(56) References Cited

U.S. PATENT DOCUMENTS

| 4,236,137 A | * | 11/1980 | Kurtz et al. ................. 338/4 |
|---|---|---|---|
| 4,519,255 A | * | 5/1985 | Ishii ........................... 73/727 |
| 4,876,893 A | * | 10/1989 | Kato et al. .................. 73/726 |
| 5,050,034 A | * | 9/1991 | Hegner et al. ............. 361/283.4 |
| 5,581,038 A | * | 12/1996 | Lampropoulos et al. ...... 73/727 |
| 6,140,144 A | * | 10/2000 | Najafi et al. ................. 438/53 |
| 6,236,095 B1 | * | 5/2001 | Caldwell ..................... 257/419 |
| 6,354,153 B1 | * | 3/2002 | Weiblen et al. .............. 73/756 |
| 6,880,406 B2 | * | 4/2005 | Yang ........................... 73/754 |
| 7,093,493 B2 | * | 8/2006 | Benzel et al. ................ 73/715 |
| 2002/0134164 A1 | * | 9/2002 | Ante et al. ................... 73/721 |
| 2005/0193827 A1 | * | 9/2005 | Fischer et al. ............... 73/754 |

FOREIGN PATENT DOCUMENTS

GB 2207804 A * 2/1989

* cited by examiner

*Primary Examiner*—Georgia Y Epps
*Assistant Examiner*—Don Williams
(74) *Attorney, Agent, or Firm*—Kenyon & Kenyon LLP

(57) ABSTRACT

A high-pressure sensor device has a pressure sensor element and an electric circuit, in particular in the form of a semiconductor component, the pressure sensor element having a membrane deformable under the effect of pressure, and a functional layer, which experiences a change in its electrical properties when deformed, and which has at least one electric terminal area, and the design and the manufacturing process being simplified in particular by the fact that the semiconductor component is directly connected to the electric terminal area via a solder layer.

30 Claims, 4 Drawing Sheets

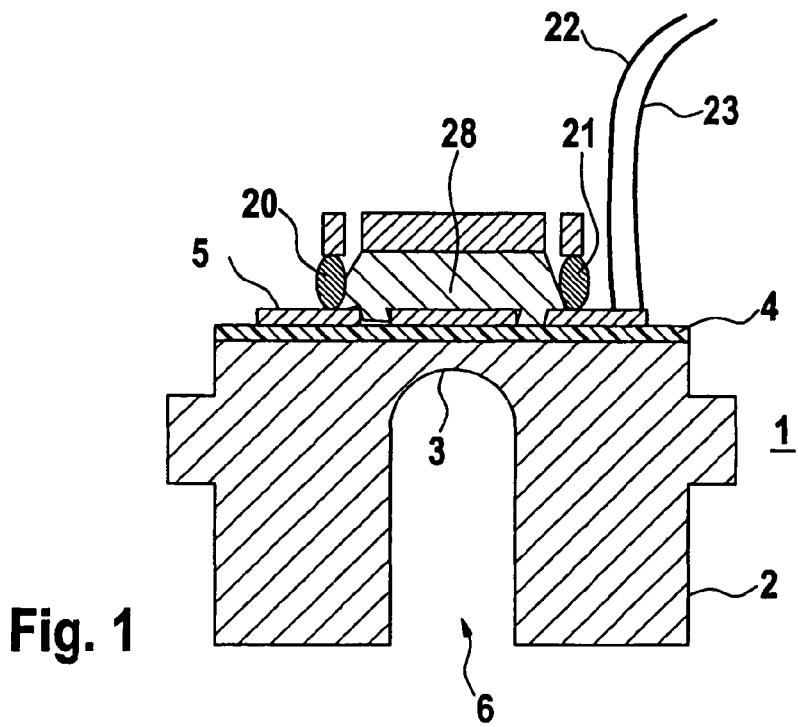
Fig. 1
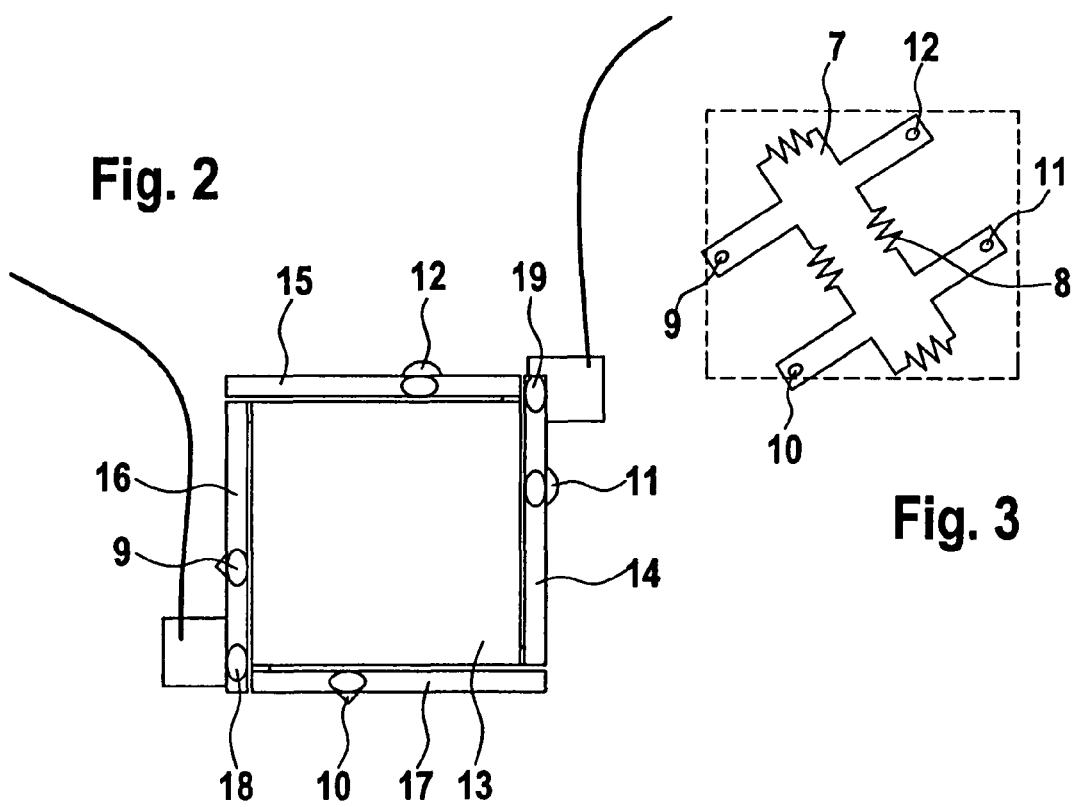
Fig. 2
Fig. 3

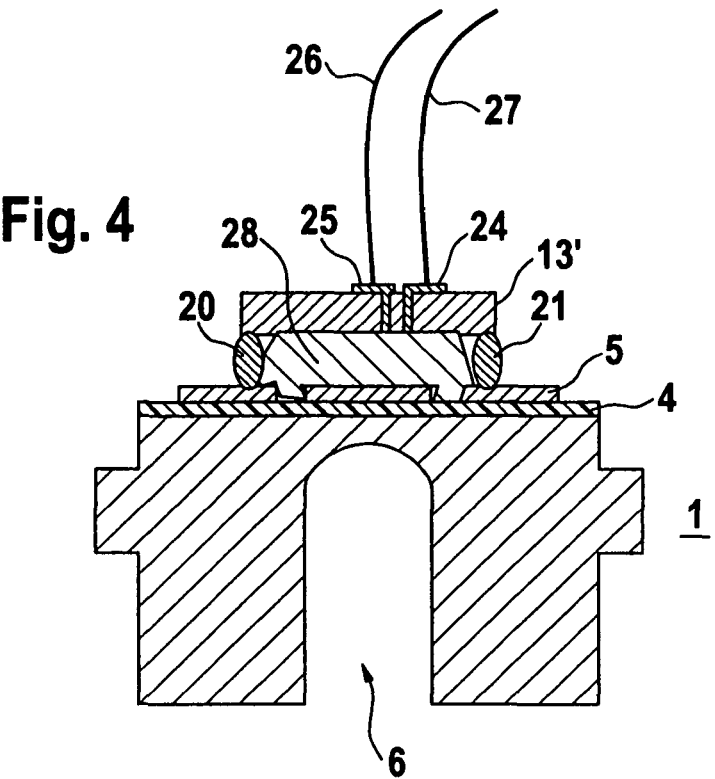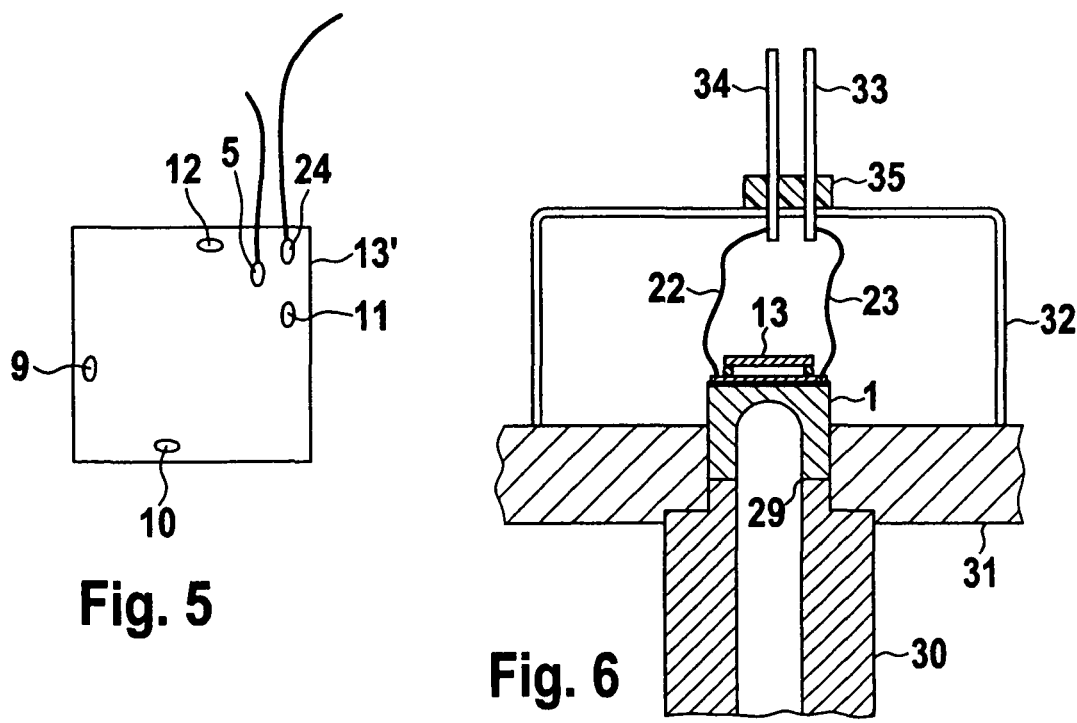

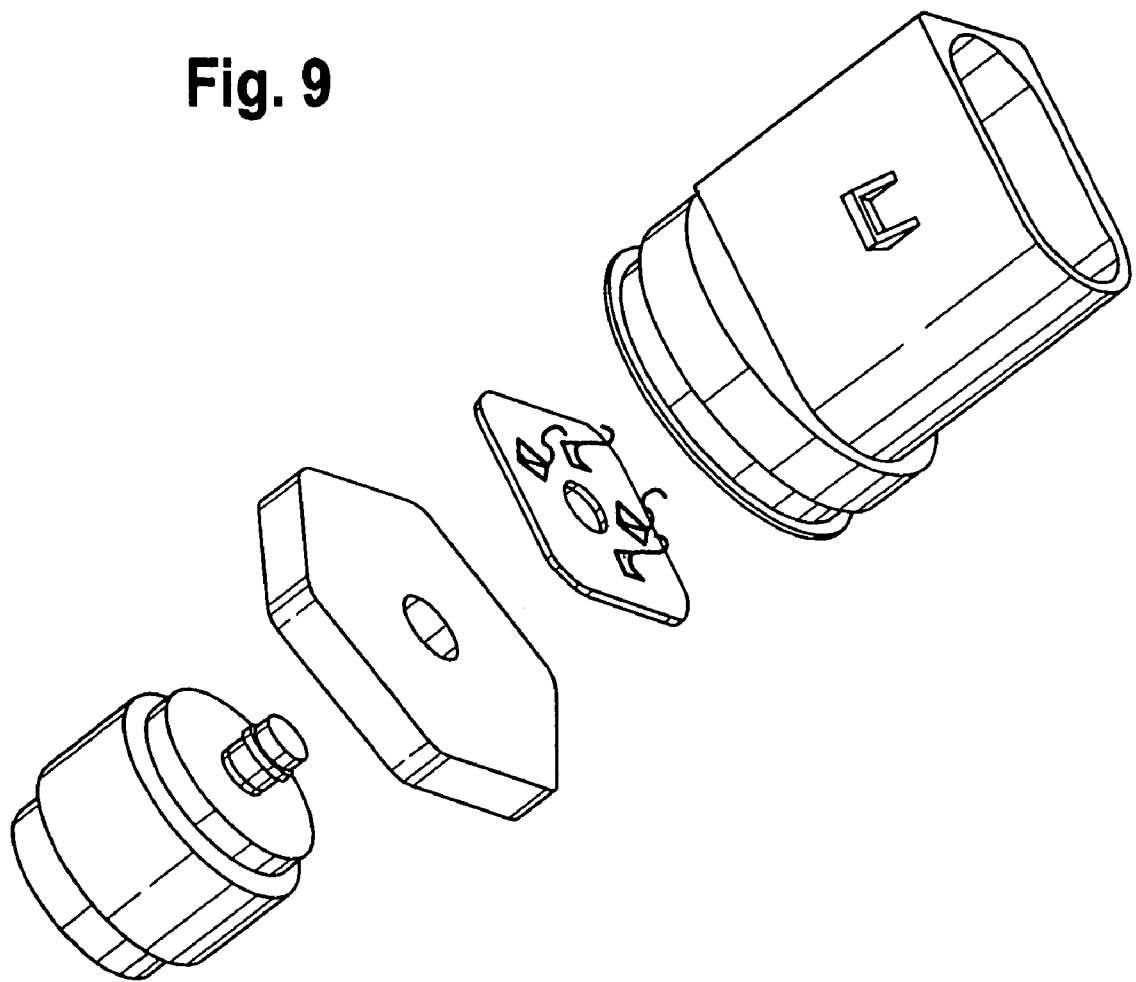

HIGH-PRESSURE SENSOR DEVICE AND METHOD FOR MANUFACTURING SAME

FIELD OF THE INVENTION

The present invention relates to a high-pressure sensor.

BACKGROUND INFORMATION

Such sensors are mostly used in the area of hydraulics to reproducibly measure pressures of a few tens to hundreds of bars. Such sensors must have an extremely stable and durable design, be corrosion-resistant and reliable from the safety point of view.

A particularly large number of high-pressure sensors is used in the automotive industry for direct gasoline injection, common-rail direct diesel injection, and in the hydraulic system of the electronic stability program.

In each of these cases, absolute reliability during use, reproducibly accurate measurement, fail-safe operation, temperature stability, and low price are essential.

For the above-named applications, the use of high-pressure sensor elements having piezoresistive functional layers made of NiCrSi alloys has been proposed. It has also been proposed that such sensor elements be bonded to an analyzer circuit situated in the high-pressure sensor device itself, thus providing a high-pressure sensor device capable of being connected to a hydraulic pressure space while delivering a preprocessed output signal.

The present invention relates to a high-pressure sensor device having a pressure sensor element and an electric circuit, in particular in the form of a semiconductor component, the pressure sensor element having a membrane which is deformable under the effect of pressure, and a functional layer which, when deformed, experiences a change in its electrical properties and has at least one electric terminal area.

In high-pressure sensor devices of this type, the above-mentioned object is achieved according to the present invention by connecting the electric circuit directly to the electric terminal area using a solder layer.

It has been proposed for existing high-pressure sensor devices that electric signals, i.e., measured quantities, of the functional layer be conducted to the appropriate analyzer circuit with the aid of bonding wires or spring contact elements or conductors integrated in flexible films. The analyzer circuit is then situated in the housing of the high-pressure sensor device independently of the pressure sensor element and is connected thereto as described with the aid of a flexible electrical connection. The analyzer circuit typically contains a PC board or a hybrid structure, at least one integrated circuit in the form of a semiconductor chip being provided with a complex part of the analyzer circuit. Further circuit elements in discrete design which are responsible for optimizing the electromagnetic properties of the high-pressure sensor device may be additionally provided within the housing.

Such a design, however, requires a plurality of manufacturing steps such as the installation of the high-pressure sensor element, the installation of the analyzer circuit, and the electric connection of these two components.

SUMMARY OF THE INVENTION

An object of the present invention is to simplify sensors of this type, in particular with respect to their design, to make less complex and more cost-effective manufacturing possible.

The design according to the present invention makes it possible for the electric circuit, in particular the semiconductor component, to be directly attached to the pressure sensor element, specifically to its functional layer, by soldering, while being electrically connected thereto in the terminal areas. The pressure sensor element is thus able to also carry the electric circuit. Therefore, these two elements do not need to be installed in the housing independently of one another. The electrical and mechanical connections of the electric circuit and the semiconductor component to the pressure sensor element are thus combined into a single operation and a single constructive feature, namely the connecting solder. The positive secondary effects of this measure are the good thermal coupling of the electric circuit to the pressure sensor element, extreme shortening of the leads, and a corresponding reduction in the sensitivity to electromagnetic interference.

The soldered bond may be implemented simply by applying solder to one of the parts to be bonded, either the functional layer of the pressure sensor element or the bottom side of the electric circuit, in particular of the semiconductor component, facing the pressure sensor element, using a printing process or another known procedure, and subjecting the two parts to a reflow process in a furnace.

Additional discrete circuit elements such as capacitors and resistors may be either firmly bonded to the semiconductor component or installed in the housing of the high-pressure sensor device and later encapsulated using a resin, for example.

The semiconductor component is effectively bonded to the functional layer using the method known as flip-chip technology. An aluminum plating containing an admixture of a few percent silicon and copper may be applied to the bottom side of the semiconductor component, typically made of silicon, facing the pressure sensor element, and this metal plating may be covered by a nickel layer. The nickel layer may have a typical thickness of between 1 μm and 5 μm and is known as the underbump metal plating. It may be additionally covered by a 50-nm gold layer as a corrosion protection layer.

The NiCrSi alloy functional layer may also be additionally provided with a nickel layer having a thickness of a few μm.

In a bumping process, which is known per se, solder beads made of PbSn or, if lead is not to be used, SnAgCu, having a diameter of approximately 100 μm, are applied to one of the two sides by a screen-printing process, for example. According to this process, the parts are joined in the desired position and bonded electrically and mechanically in a reflow furnace, by melting in a known manner. A minimum distance of approximately 200 μm between the bump contacts is easily implementable in this case.

In the area between the semiconductor component and the functional layer, which is not filled by the molten solder, a filling (underfill) by an organic binder, for example, an epoxy resin, may be used. The binder should be elastic in order not to prevent the deformation of the functional layer, which is necessary for measuring pressure changes.

Since the membrane of a pressure sensor element typically used for measuring high pressures is often made of steel, an insulation layer is to be provided between the membrane and the piezoelectric functional layer, in particular when the latter has different terminal areas electrically isolated from one another. The proposed design makes automatic machining possible, with most operations being performed on the outer surface of the membrane, facing the semiconductor component (work piece carrying face). The insulation layer and then the functional layer are first applied to this face, and the solder bumps and then the analyzer circuit in the form of the semiconductor component are then positioned there. The organic binder (underfill) is also introduced before or after the reflow process thus protecting (passivating) the functional layer against external influences. The most complex and sensitive operations in building the high-pressure sensor device may thus be performed from a single reference surface.

The high-pressure sensor may then be bonded to a pressure nozzle by welding and the unit thus obtained may be provided with a housing.

BRIEF DESCRIPTION OF THE DRAWINGS

FIG. 1 schematically shows a longitudinal section of parts of a high-pressure sensor device.

FIG. 2 shows a top view of a semiconductor component as may be used according to FIG. 1.

FIG. 3 shows the function elements of the functional layer underneath the semiconductor component illustrated in FIG. 2.

FIG. 4 schematically shows a longitudinal section of parts of a high-pressure sensor device having a different type of contacting of the semiconductor component compared to FIG. 1.

FIG. 5 shows a top view of the semiconductor component of FIG. 4.

FIG. 6 schematically shows parts of the high-pressure sensor device of FIG. 1 installed in a housing.

FIG. 9 shows an exploded view of a high-pressure sensor device according to FIG. 8 from the related art.

DETAILED DESCRIPTION

Figure 7:
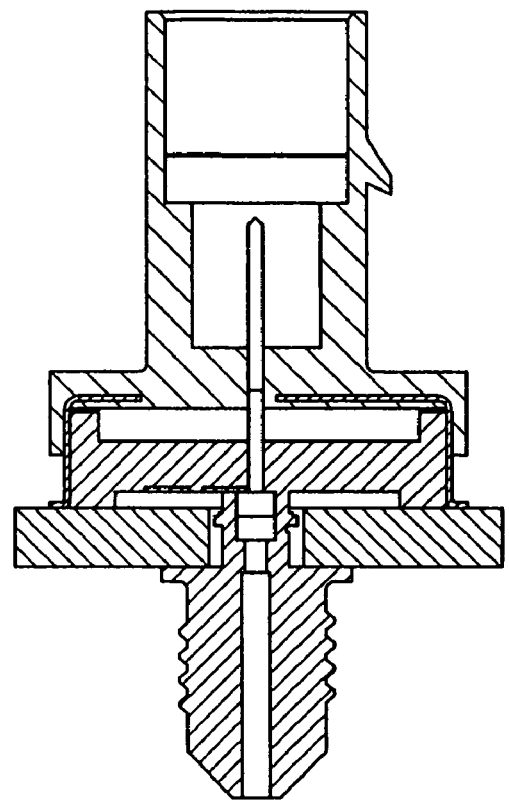
FIG. 7 schematically shows a longitudinal view of an overall view of a high-pressure sensor device.
Figure 8:
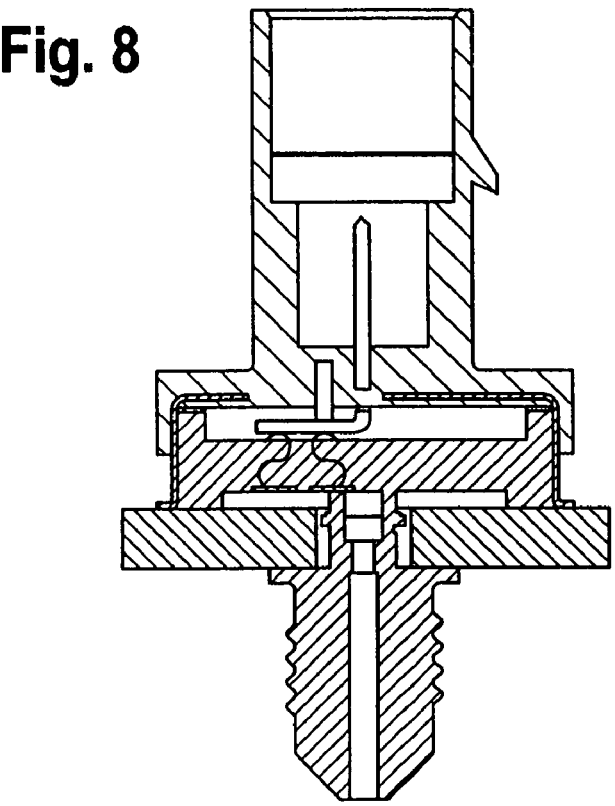
FIG. 8 shows a longitudinal view of an overall view of a high-pressure sensor device according to the related art.

FIG. 1 schematically shows a pressure sensor element 1 having a steel substrate 2, a membrane 3, an insulation layer 4, and a functional layer 5. Steel substrate 2 and membrane 3, which is also made of steel, surround a pressure space 6, which is coupled to a hydraulic connection, so that the pressure in an adjoining hydraulic space may act on membrane 3. The thickness of the membrane is such that it suffers a mechanical deflection under pressures that may occur.

A functional layer 5 is applied to membrane 3 with an insulation layer 4, made of silicon oxide, silicon nitride or a metal oxide, for example, being situated in between. Functional layer 5 is made of a piezoresistive material such as an NiCrSi alloy. When deformed, it produces, due to a deflection of membrane 3, a change in resistance or piezoelectric voltage, which may be picked up and measured.

FIG. 3 shows functional elements 7, 8 of functional layer 5, which form a bridge circuit having terminal areas 9, 10, 11, 12. Electric signals may be picked up at these terminal areas and supplied to an analyzer circuit as illustrated in FIG. 2 in the form of semiconductor component 13, which is made of a silicon chip containing the appropriate semiconductor functional elements in the form of logic gates and similar elements.

As FIG. 2 shows, electrical terminal areas 9, 10, 11, 12 of the functional layer adjoin the connection points of semiconductor component 13, located on lugs 14, 15, 16, 17 of semiconductor component 13. Each lug is connected to the core of the semiconductor component via narrow bridges. A high degree of elasticity is achieved in this way, so that in the case of different thermal expansions of functional layer 5 and semiconductor component 13, they may be compensated by the elastic deformation of lugs 14, 15, 16, 17. The lugs are provided on semiconductor component 13 in such a way that grooves which do not cut through the semiconductor component completely, but have a defined depth, are initially provided from one side of the semiconductor component, and the semiconductor component is then machined from the other side until the bottom of the groove is reached, so that the lugs are separated from the core of the semiconductor component.

Semiconductor component 13 has, in addition to the above-named connection points, additional terminals 18, 19, at which the preprocessed measuring signals are output by the semiconductor component. These output signals are supplied again to functional layer 5 by the corresponding solder bumps which are identified by the numbers 20, 21 in FIG. 1, and which establish the conductive connections between semiconductor component 13 and functional layer 5; the output signals are then supplied to an external terminal of the high-pressure sensor device with the aid of connecting wires 22, 23.

FIG. 4 shows a pressure sensor element 1 having an insulation layer 4 and a functional layer 5, identical to those depicted in FIG. 1, semiconductor component 13' also being electrically conductively connected to functional layer 5 via solder bumps 20, 21; unlike in FIG. 1, however, the output signals are not supplied back to functional layer 5 after processing in semiconductor component 13', but are supplied directly to the top side of semiconductor component 13' via plated holes 24, 25, and from there are supplied to an external terminal of the high-pressure sensor device via connecting wires 26, 27.

FIG. 5 shows the corresponding top view of semiconductor component 13', where terminal areas 9, 10, 11, 12 are present in the same arrangement as in FIG. 2. However, additional terminals 18, 19 are implemented differently, namely via plated holes 24, 25 as indicated in FIG. 4.

FIG. 6 schematically shows the installation of the above-described parts of a high-pressure sensor device in a housing, reference being made to an embodiment according to FIGS. 1, 2, and 3.

Unlike in FIGS. 1 and 4, semiconductor component 13 is further simplified, and the underfill, identified in FIGS. 1 and 4 with the number 28, is also omitted. The underfill is typically made of an epoxy resin and fills the gap between semiconductor component 13, 13' and the corresponding functional layer 5 located between solder bumps 20, 21. The organic substance also bonds the above-mentioned two parts together, while the elasticity of the underfill material must be ensured in order to prevent the functional layer from being affected by the membrane deflection.

FIG. 6 shows that pressure sensor element 1 is welded firmly and hydraulically tightly to a pressure nozzle 30 in area 29. This area is firmly bonded to a hex flange 31. Hex flange 31 carries a plastic housing 32, which surrounds semiconductor component 13.

In addition, housing 32 carries fixed external terminals in the form of metal pins 33, 34, which may form plug pins, for example. Metal pins 33, 34 are bonded to housing 32 via a solder or a casting compound 35. Leads 22, 23 connect semiconductor component 13 to external terminals 33, 34. Discrete circuit elements such as resistors or capacitors, which are connected to leads 22, 23 or inserted therein and may be used for the wiring of the high-pressure sensor device, for example, as protection against electromagnetic radiation, may be situated either within housing 32 or within an additional housing located further on the outside and not illustrated in FIG. 6. The inside of housing 32 and/or parts of the housing, located further outside and illustrated in FIG. 7, may be at least partially encapsulated using a conventional casting compound for stabilization, sealing, and electrical shielding.

The illustrated high-pressure sensor device is manufacturable in a simple and cost-effective way and connectable to a high-pressure sensor device in a particularly simple manner, the output measuring signals being easy to preprocess and further process. The present invention allows the above-described device to have a compact design and high degree of reliability and stability. Of course, the features of the different embodiments described as advantageous may also be combined within the scope of the invention.

LIST OF REFERENCE SYMBOLS

| | |
|---|---|
| 1 | Pressure sensor element |
| 2 | Steel substrate |
| 3 | Membrane |
| 4 | Insulation layer |
| 5 | Functional layer |
| 6 | Pressure space |
| 7, 8 | Functional elements |
| 9, 10, 11, 12 | Terminal areas |
| 13, 13' | Electric circuit, semiconductor component |
| 14, 15, 16, 17 | Lugs |
| 18, 19 | Additional terminals |
| 20, 21 | Solder bumps |
| 22, 23 | Connecting wires |
| 24, 25 | Plated holes |
| 26, 27 | Connecting wires |
| 28 | Underfill |
| 29 | Region |
| 30 | Pressure nozzles |
| 31 | Hex flange |
| 32 | Plastic housing |
| 33, 34 | External terminals |

What is claimed is:

1. A high-pressure sensor device, comprising:
    a pressure sensor element including a membrane deformable under pressure and a functional layer mechanically coupled to the membrane, wherein the functional layer includes at least one electric terminal area and the functional layer undergoes a change in an electrical property thereof when deformed;
    an electric circuit mounted above the functional layer, opposite the membrane, the electric circuit including an electrically-conductive elastic interface, and being arranged to receive and analyze an electric signal indicative of the change in the electrical property of the functional layer; and
    a solder layer forming a direct electrical connection between the elastic interface and the at least one electric terminal, in addition to forming a mounting connection of the electric circuit.

2. The high-pressure sensor device as recited in claim 1, wherein the functional layer is surface-bonded to the membrane.

3. The high-pressure sensor device as recited in claim 1, further comprising:
    an insulation layer provided between the functional layer and the membrane.

4. The high-pressure sensor device as recited in claim 1, wherein:
    the electric circuit is connected to two terminal areas of the functional layer via the solder layer, and
    the interface includes at least one elastic molded element for compensating thermal stresses, wherein the at least one elastic molded element is located in the electric circuit between the two terminal areas.

5. The high-pressure sensor device as recited in claim 1, wherein the membrane includes steel.

6. The high-pressure sensor device as recited in claim 1, wherein the functional layer includes a piezoelectric material.

7. The high-pressure sensor device as recited in claim 6, wherein the functional layer includes an NiCrSi alloy.

8. The high-pressure sensor device as recited in claim 1, wherein:
    the electric circuit in the form of a semiconductor component includes, on its bottom side facing the functional layer, an aluminum plating having an admixture of several percent silicon and copper, which is covered by a nickel layer.

9. The high-pressure sensor device as recited in claim 1, wherein the electric circuit is bonded to the functional layer by an organic bonding compound in at least one area in which no solder layer is provided.

10. The high-pressure sensor device as recited in claim 1, further comprising:
    a housing surrounding electric circuit and the pressure sensor element, wherein:
        the housing includes an external electric terminal, and
        additional electric circuit elements of at least one of the electric circuit and the pressure sensor element are situated in the housing.

11. The high-pressure sensor device as recited in claim 1, wherein the electric circuit includes a semiconductor component.

12. The high-pressure sensor device as recited in claim 1, wherein the interface comprises a flexible lug.

13. The high-pressure sensor device as recited in claim 12, wherein the flexible lug is separated from a central portion of the electric circuit.

14. The high-pressure sensor device as recited in claim 1, further comprising:
    an insulation layer provided between the functional layer and the membrane;
    wherein the interface includes a flexible lug, wherein the flexible lug is separated from a central portion of the electric circuit, and wherein the functional layer is surface-bonded to the membrane, and
    wherein the electric circuit is connected to two terminal areas of the functional layer via the solder layer, and the interface includes at least one elastic molded element for compensating thermal stresses, the at least one elastic molded element being located in the electric circuit between the two terminal areas.

15. The high-pressure sensor device as recited in claim 14, wherein the electric circuit in the form of a semiconductor component includes, on its bottom side facing the functional layer, an aluminum plating having an admixture of several percent silicon and copper, which is covered by a nickel layer.

16. The high-pressure sensor device as recited in claim 15, wherein the membrane includes steel, and the functional layer includes a piezoelectric material.

17. The high-pressure sensor device as recited in claim 16, wherein the functional layer includes an NiCrSi alloy.

18. The high-pressure sensor device as recited in claim 14, wherein the electric circuit is bonded to the functional layer by an organic bonding compound in at least one area in which no solder layer is provided.

19. The high-pressure sensor device as recited in claim 18, wherein the membrane includes steel, and the functional layer includes a piezoelectric material.

20. The high-pressure sensor device as recited in claim 19, wherein the functional layer includes an NiCrSi alloy.

21. A method for manufacturing a high-pressure sensor device, comprising:
- forming an electrically-conductive elastic interface on an electric circuit;
- mounting the electric circuit above a functional layer of the sensor device;
- connecting the electric circuit to terminal areas of a functional layer in such a way that solder is first applied to one of two elements including the interface and the functional layer; and
- then joining and soldering the two elements using a soldering procedure, so as to form an electrical connection between the two elements, wherein the soldering also forms a mounting connection of the electric circuit.

22. The method as recited in claim 21, further comprising:
- forming the interface by machining at least one lug from a housing of the electric circuit.

23. The method as recited in claim 22, further comprising:
- separating the lug from a central portion of the electric circuit body.

24. The method as recited in claim 21, further comprising:
- forming the interface by machining at least one lug from a housing of the electric circuit; and
- separating the lug from a central portion of the electric circuit body; and
- providing an insulation layer between the functional layer and the membrane;
- wherein the at least one lug includes a flexible lug, wherein the flexible lug is separated from a central portion of the electric circuit, and wherein the functional layer is surface-bonded to the membrane, and
- wherein the electric circuit is connected to the two terminal areas of the functional layer via the solder layer, and the interface includes at least one elastic molded element for compensating thermal stresses, the at least one elastic molded element being located in the electric circuit between the two terminal areas.

25. The method as recited in claim 24, wherein the electric circuit in the form of a semiconductor component includes, on its bottom side facing the functional layer, an aluminum plating having an admixture of several percent silicon and copper, which is covered by a nickel layer.

26. The method as recited in claim 25, wherein the membrane includes steel, and the functional layer includes a piezoelectric material.

27. The method as recited in claim 26, wherein the functional layer includes an NiCrSi alloy.

28. The method as recited in claim 24, wherein the electric circuit is bonded to the functional layer by an organic bonding compound in at least one area in which no solder layer is provided.

29. The method as recited in claim 28, wherein the membrane includes steel, and the functional layer includes a piezoelectric material.

30. The method as recited in claim 29, wherein the functional layer includes an NiCrSi alloy.

* * * * *